(12) United States Patent
Lin et al.

(10) Patent No.: US 10,939,362 B2
(45) Date of Patent: Mar. 2, 2021

(54) APPARATUSES AND METHODS FOR SYSTEM INFORMATION (SI) REQUEST THROUGH A CONTENTION-BASED RANDOM ACCESS PROCEDURE

(71) Applicant: MEDIATEK INC., Hsinchu (TW)

(72) Inventors: Guan-Yu Lin, Hsinchu (TW); Chia-Chun Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/242,262

(22) Filed: Jan. 8, 2019

(65) Prior Publication Data

US 2019/0215760 A1 Jul. 11, 2019

Related U.S. Application Data

(60) Provisional application No. 62/616,039, filed on Jan. 11, 2018.

(51) Int. Cl.
*H04W 4/00* (2018.01)
*H04W 48/14* (2009.01)
*H04W 74/08* (2009.01)
*H04W 80/02* (2009.01)
*H04W 88/12* (2009.01)
*H04W 88/02* (2009.01)

(52) U.S. Cl.
CPC ....... *H04W 48/14* (2013.01); *H04W 74/0833* (2013.01); *H04W 80/02* (2013.01); *H04W 88/023* (2013.01); *H04W 88/12* (2013.01)

(58) Field of Classification Search
None
See application file for complete search history.

(56) References Cited

U.S. PATENT DOCUMENTS

| 9,936,469 | B2 | 4/2018 | Ji et al. |
| 2014/0301330 | A1 | 10/2014 | Lee et al. |
| 2017/0359840 | A1 | 12/2017 | Ly et al. |
| 2018/0270866 | A1* | 9/2018 | Loehr ............... H04W 72/1289 |

(Continued)

FOREIGN PATENT DOCUMENTS

| CN | 101801096 A | 8/2010 |
| CN | 102014516 A | 4/2011 |

(Continued)

*Primary Examiner* — Zewdu A Beyen
(74) *Attorney, Agent, or Firm* — Oblon, McClelland, Maier & Neustadt, L.L.P.

(57) ABSTRACT

A User Equipment (UE) including a wireless transceiver and a controller is provided. The wireless transceiver performs wireless transmission and reception to and from a service network. The controller performs the following during a contention-based random access procedure: transmitting a first message comprising a System Information (SI) request, to the service network via the wireless transceiver; receiving a second message for a contention resolution from the service network via the wireless transceiver in response to transmitting the first message; determining whether the contention resolution is successful according to the second message; and indicating a reception of an acknowledgement for the SI request to an upper layer of a Media Access Control (MAC) layer in response to determining that the contention resolution is successful.

11 Claims, 4 Drawing Sheets

(56) References Cited

U.S. PATENT DOCUMENTS

2019/0070336 A1    3/2019  Min et al.
2019/0124715 A1*   4/2019  Chen .................... H04W 76/11

FOREIGN PATENT DOCUMENTS

| CN | 102740492 A   | 10/2012 |
| CN | 107079385 A   | 8/2017  |
| WO | 2013/138701 A2 | 9/2013 |
| WO | 2017/155328 A1 | 9/2017 |

* cited by examiner

APPARATUSES AND METHODS FOR SYSTEM INFORMATION (SI) REQUEST THROUGH A CONTENTION-BASED RANDOM ACCESS PROCEDURE

CROSS REFERENCE TO RELATED APPLICATIONS

This Application claims priority of U.S. Provisional Application No. 62/616,039, filed on Jan. 11, 2018, the entirety of which is incorporated by reference herein.

BACKGROUND OF THE APPLICATION

Field of the Application

The application generally relates to on-demand System Information (SI) and, more particularly, to apparatuses and methods for SI request through a contention-based random access procedure.

Description of the Related Art

With the growing demand for ubiquitous computing and networking, various cellular technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

These multiple cellular technologies have been adopted in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, improving services, and making use of a new spectrum, and to better integrate with other open standards using OFDMA with a cyclic prefix (CP) on the downlink (DL) and on the uplink (UL), as well as to support beamforming, Multiple-Input Multiple-Output (MIMO) antenna technology, and carrier aggregation.

The System Information (SI) in 5G NR is categorized into minimum SI and other SI. The minimum SI may include the most essential information, such as the information related to cell accesses, and the minimum SI is periodically broadcasted by the network side. The other SI may include addition information that is not included in the minimum SI, and the other SI may be configured to be provided on demand at the User Equipment's (UE's) request, which is referred to herein as on-demand SI.

BRIEF SUMMARY OF THE APPLICATION

Currently in the 3GPP specifications for 5G NR, there are two kinds of procedures for a UE to request for on-demand SI, including the contention-free random access procedure (i.e., Msg1-based random access procedure) and the contention-based random access procedure (i.e., the Msg3-based random access procedure). Regarding the case of SI request through the contention-based random access procedure, the UE only knows whether the contention-based random access procedure is successfully completed based on the received Msg4. However, it is still unclear how the UE knows if the SI request is successfully received by the network side or not, causing indeterminate behaviors of the UE.

In order to prevent such indeterminate behaviors, the present application proposes specific measures for the UE to decide whether the SI request sent during the contention-based random access procedure is successfully received by the network side.

In one aspect of the application, a UE comprising a wireless transceiver and a controller is provided. The wireless transceiver is configured to perform wireless transmission and reception to and from a service network. The controller is configured to perform the following during a contention-based random access procedure: transmitting a first message comprising an SI request to the service network via the wireless transceiver; receiving a second message for a contention resolution from the service network via the wireless transceiver in response to transmitting the first message; determining whether the contention resolution is successful according to the second message; and indicating a reception of an acknowledgement for the SI request to an upper layer of a Media Access Control (MAC) layer in response to determining that the contention resolution is successful.

In another aspect of the application, a method for SI request through a contention-based random access procedure, executed by a UE wirelessly connected to a service network, is provided. The method for SI request through a contention-based random access procedure comprises the steps of: transmitting a first message comprising an SI request to the service network; receiving a second message for a contention resolution from the service network in response to transmitting the first message; determining whether the contention resolution is successful according to the second message; and indicating a reception of an acknowledgement for the SI request to an upper layer of a MAC layer in response to determining that the contention resolution is successful.

Other aspects and features of the present application will become apparent to those with ordinarily skill in the art upon review of the following descriptions of specific embodiments of the UEs and the methods for SI request through a contention-based random access procedure.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
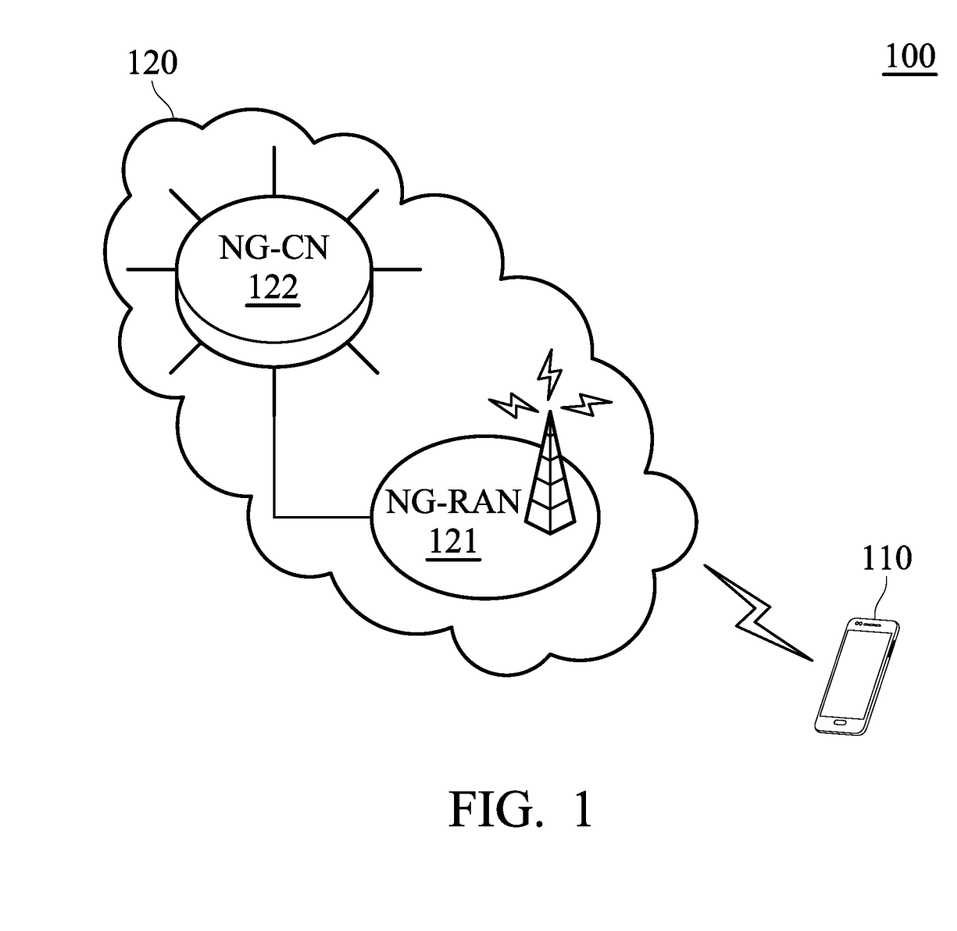
FIG. 1 is a block diagram of a wireless communication environment according to an embodiment of the application.

FIG. 1 is a block diagram of a wireless communication environment according to an embodiment of the application.

The wireless communication environment 100 may include a User Equipment (UE) 110 and a 5G NR network 120, wherein the UE 110 may receive System Information (SI) from the 5G NR network 120, and may be wirelessly connected to the 5G NR network 120 for obtaining mobile services.

Please note that, in the present application, the SI includes minimum SI and the other SI. Minimum SI is periodically broadcasted, and it includes basic information required for initial access to a cell and information for acquiring any other SI broadcast periodically or provisioned via an on-demand basis. The other SI encompasses everything not included in the minimum SI. The other SI may either be broadcasted, or provisioned in a dedicated manner, either triggered by the network or upon request from the UE 110. In the present application, the other SI is configured to be provided on demand at the UE's request, and the other SI may also be called on-demand SI. Before the UE 110 sends a request for the other SI, it needs to know whether the other SI is available in the cell and whether the other SI is broadcasted or not (e.g. by checking the minimum SI). The UE 110 in the RRC IDLE state or RRC INACTIVE state should be able to request the on-demand SI without state transition.

The UE 110 may be a feature phone, a smartphone, a panel Personal Computer (PC), a laptop computer, or any wireless communication device supporting the cellular technology (i.e., the 5G NR technology) utilized by the 5G NR network 120. Particularly, the UE 110 may support the beamforming technique for wireless transmission and/or reception.

The 5G NR network 120 includes a Next Generation Radio Access Network (NG-RAN) 121 and a Next Generation Core Network (NG-CN) 122.

The NG-RAN 121 is responsible for processing radio signals, terminating radio protocols, and connecting the UE 110 with the NG-CN 122. In addition, the NG-RAN 121 is responsible for periodically broadcasting the minimum SI and providing the other SI at the request of the UE 110. The NG-RAN 121 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. The UE 110 may camp on one or more cells formed by one or more gNBs or TRPs, wherein the cell(s) which the UE 110 is camped on may include a Primary Cell (PCell) and one or more Secondary Cells (SCells).

The NG-CN 122 generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF may provide UE-based authentication, authorization, mobility management, etc. The SMF may be responsible for session management and allocates Internet Protocol (IP) addresses to UEs, and it may also select and control the UPF for data transfer. If a UE has multiple sessions, different SMFs may be allocated to each session to manage them individually and possibly provide different functions per session. The AF may provide information on the packet flow to PCF responsible for policy control in order to support Quality of Service (QoS). Based on the information, the PCF may determine policies about mobility and session management to make the AMF and the SMF operate properly. The AUSF may store data for authentication of UEs, while the UDM may store subscription data of UEs.

It should be noted that the 5G NR network 120 depicted in FIG. 1 is for illustrative purposes only and is not intended to limit the scope of the application. The application could be applied to other cellular technologies, such as a future enhancement of the 5G NR technology.

Figure 2:
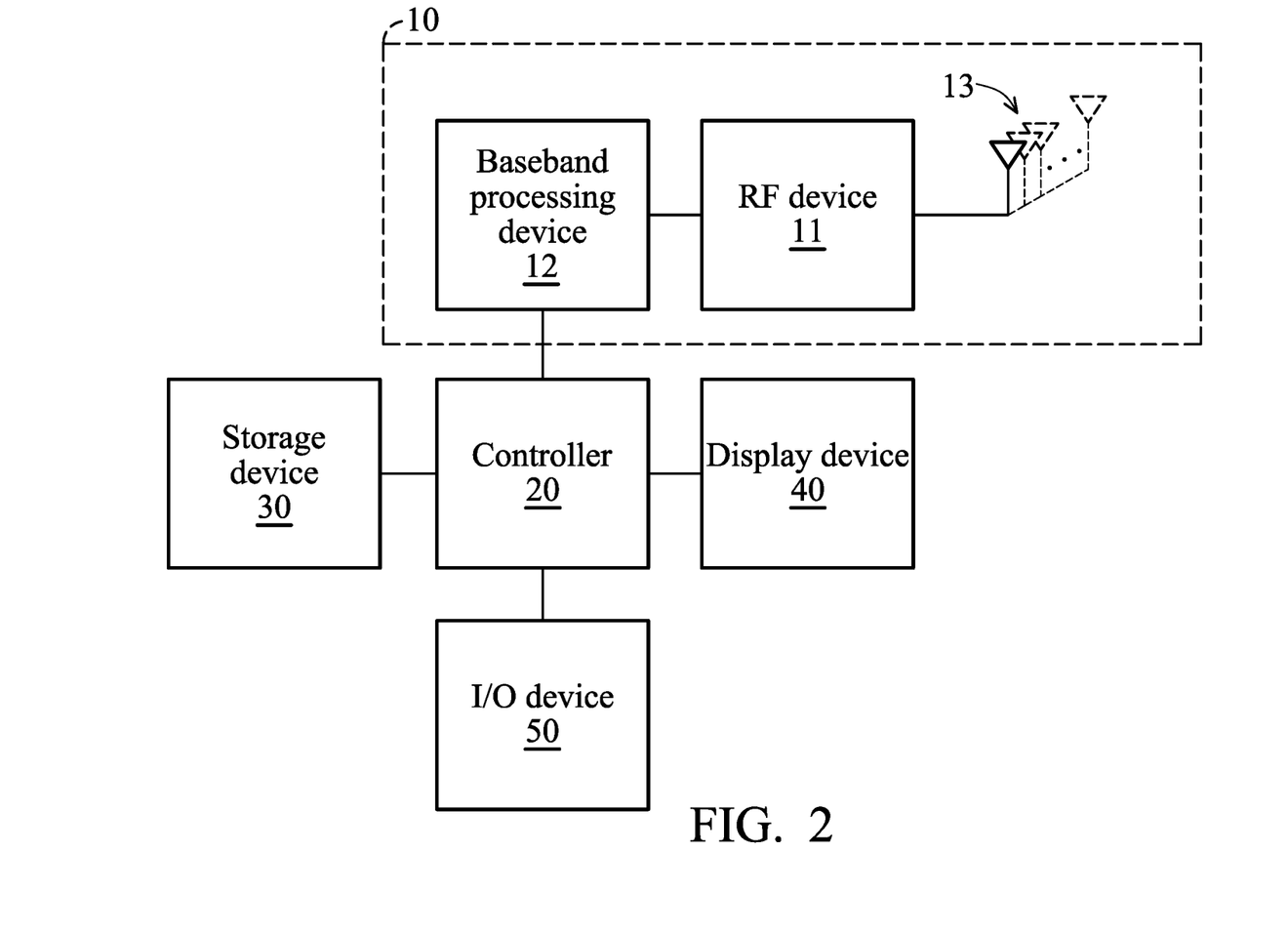
FIG. 2 is a block diagram illustrating a UE according to an embodiment of the application.

FIG. 2 is a block diagram illustrating a UE according to an embodiment of the application.

A UE may include a wireless transceiver 10, a controller 20, a storage device 30, a display device 40, and an Input/Output (I/O) device 50.

The wireless transceiver 10 may be configured to perform wireless transmission and reception to and from the NG-RAN 121. Specifically, the wireless transceiver 10 may include a Radio Frequency (RF) device 11, a baseband processing device 12, and antenna(s) 13, wherein the antenna(s) 13 may include one or more antennas for beamforming. The baseband processing device 12 may be configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30

GHz-300 GHz for mmWave) utilized in the 5G NR technology, or another radio frequency, depending on the cellular technology in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the 5G NR network 120, storing and retrieving data (e.g., program code) to and from the storage device 30, sending a series of frame data (e.g. representing text messages, graphics, images, etc.) to the display device 40, and receiving signals from the I/O device 50. In particular, the controller 20 may coordinate the aforementioned operations of the wireless transceiver 10, the storage device 30, the display device 40, and the I/O device 50 for performing the method for SI request through a contention-based random access procedure.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocol(s) (e.g., the communication protocol used for communicating with the 5G NR network 120), and/or the method for SI request through a contention-based random access procedure.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, a UE may not include the display device 40 and/or the I/O device 50.

Figure 3:
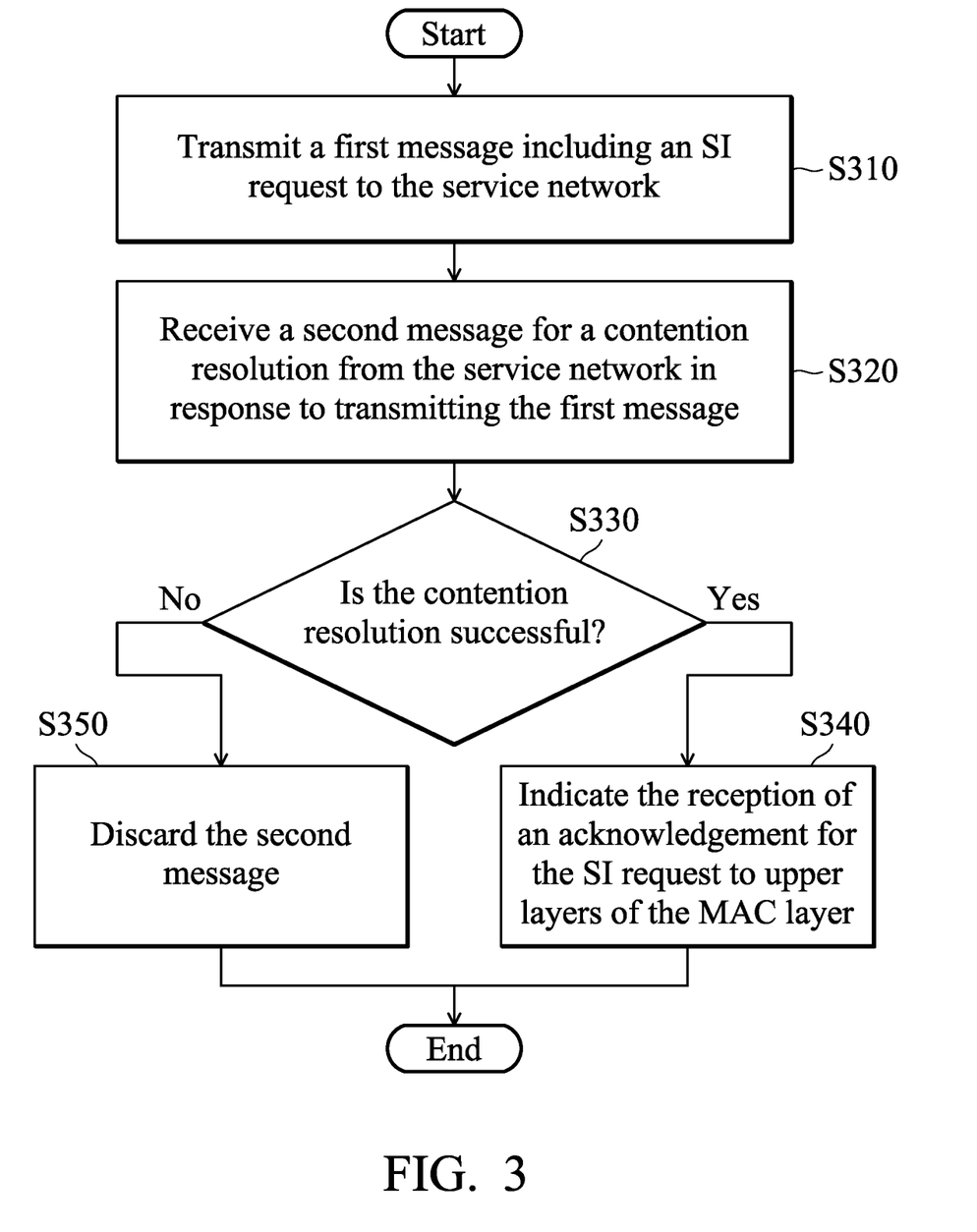
FIG. 3 is a flow chart illustrating the method for SI request through a contention-based random access procedure according to an embodiment of the application.

FIG. 3 is a flow chart illustrating the method for SI request through a contention-based random access procedure according to an embodiment of the application.

In this embodiment, the method for SI request through a contention-based random access procedure may be executed by a UE (e.g., the UE 110) wirelessly connected to a service network (e.g., the 5G NR network 120).

To begin with, the UE transmits a first message including an SI request to the service network (step S310). Specifically, the first message is a message for a scheduled transmission, which may be referred to as an Msg3 in a contention-based random access procedure.

Please note that, unlike an Msg3 used in a contention-based random access procedure that is not initiated for SI request, the Msg3 in this application does not include a UE contention resolution identity. Instead, the Msg3 in this application includes an SI request which includes information requesting on-demand SI.

In one embodiment, the Msg3 in the application may be an RRCSystemInfoRequest message in compliance with the 3GPP Technical Specification (TS) 38.331, release 15, and the SI request may be a list of requested SI types, each indicates a type of SI that is requested by the UE. In addition, from the UE's perspective of the Media Access Control (MAC) layer of the communication protocol, the RRCSystemInfoRequest message may be encapsulated in a Common Control Channel (CCCH) Service Data Unit (SDU).

Subsequent to step S310, the UE receives a second message for a contention resolution from the service network in response to transmitting the first message (step S320). Specifically, the second message may be referred to as an Msg4 in a contention-based random access procedure. From the UE's perspective of the MAC layer, the Msg4 may be a MAC Control Element (CE).

Next, the UE determines whether the contention resolution is successful according to the second message (step S330).

Specifically, the determination in step S330 may refer to checking if a UE contention resolution identity in the second message (i.e., Msg4) matches the SI request in the first message (i.e., Msg3). In one embodiment, the second message may be a MAC CE, and the first message may include a CCCH SDU which further includes the SI request in the first few bits. If the content of the UE contention resolution identity in the MAC CE is equal to the content of the SI request included in the CCCH SDU of the first message (i.e., the Msg3), the UE may consider the contention resolution is successful.

Subsequent to step S330, if the contention resolution is successful, the UE indicates the reception of an acknowledgement for the SI request to upper layers of the MAC layer (i.e., the UE may consider the SI request is successfully received by the service network) (step S340), and the method ends. Specifically, the upper layers include at least the Radio Resource Control (RRC) layer of the communication protocol.

Otherwise, in response to determining that the contention resolution is not successful, the UE considers the SI request is not successfully received by the service network, and discards the second message (step S350), and the method ends.

Specifically, subsequent to step S350, the UE may wait for a predetermined period of time (i.e., backoff time period)

and retry the contention-based random access procedure, as long as the number of retires is less than the maximum retry limit.

Other detailed descriptions of the contention-based random access procedure are omitted herein since they are beyond the scope of the application, and references may be made to the 3GPP TS 38.321, release 15.

Please note that the 3GPP specifications mentioned herein are used to teach the spirit of the application, and the application should not be limited thereto.

Figure 4:
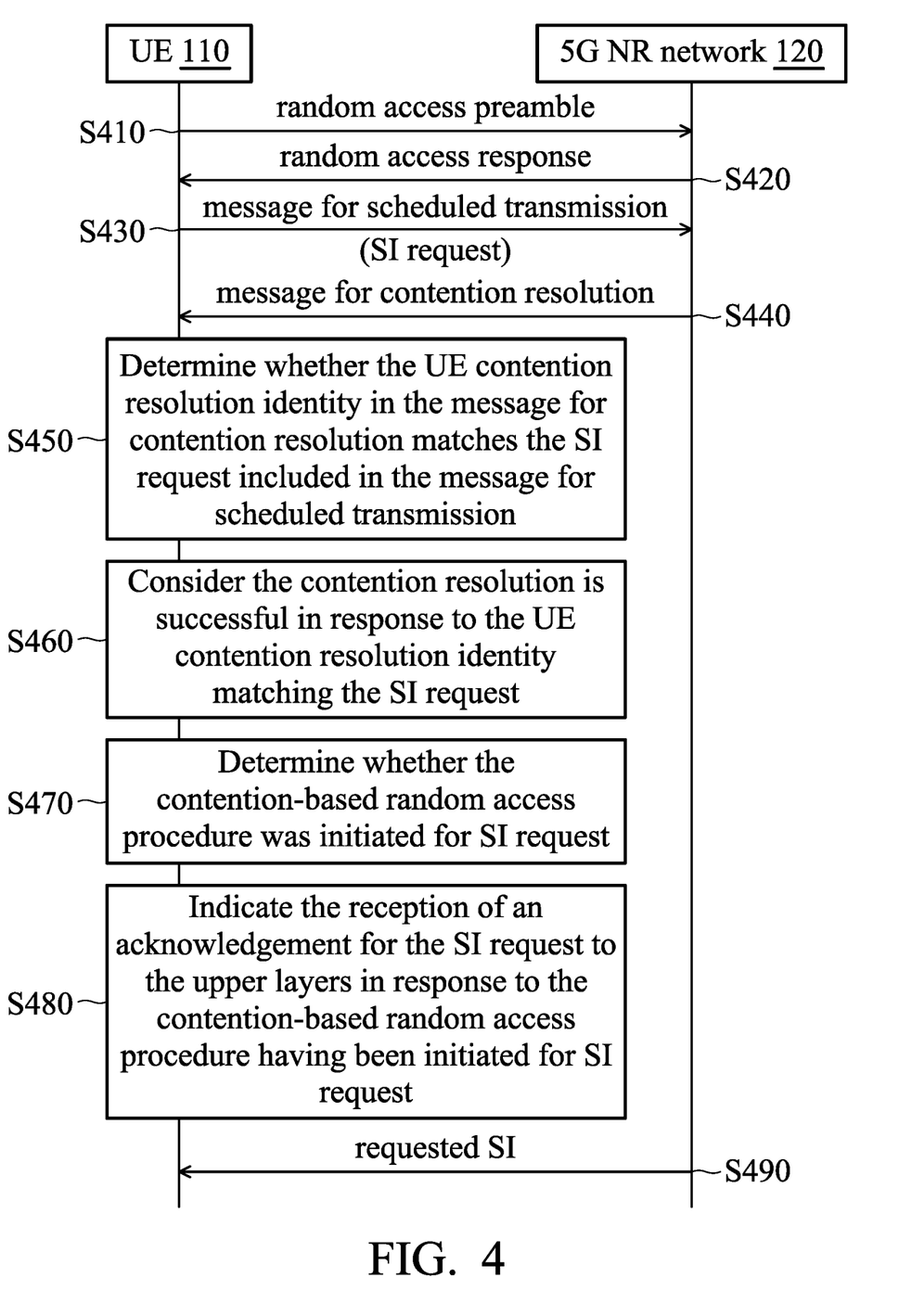
FIG. 4 is a message sequence chart illustrating SI request through a contention-based random access procedure according to an embodiment of the application.

FIG. 4 is a message sequence chart illustrating SI request through a contention-based random access procedure according to an embodiment of the application.

To begin with, the UE 110 transmits a random access preamble configured for contention-based random access procedures to the 5G NR network 120 (e.g., a gNB or TRP of the NG-RAN 121) (step S410).

Specifically, the random access preamble may be randomly selected with equal probability from a set of random access preambles configured for contention-based random access procedures.

Next, when receiving the random access preamble, the 5G NR network 120 transmits a random access response to the UE (step S420).

Specifically, the random access response may include a Timing Advance (TA) command, an uplink grant, and/or a Temporary Cell Radio Network Temporary Identifier (TC-RNTI).

Subsequently, in response to receiving the random access response, the UE 110 transmits a message for scheduled transmission (i.e., an Msg3 in contention-based random access procedures), which includes an SI request, to the 5G NR network 120 (step S430).

Please note that, in the present application, the message for scheduled transmission does not include a UE contention resolution identity (e.g., the TC-RNTI included in the random access response) due to the fact that this contention-based random access procedure was not initiated for general random access purposes.

When receiving the message for scheduled transmission, the 5G NR network 120 transmits a message for contention resolution (i.e., an Msg4 in contention-based random access procedures) to the UE 110 (step S440).

Next, the UE 110 determines whether the UE contention resolution identity in the message for contention resolution (i.e., the Msg4) matches the SI request included in the message for scheduled transmission (i.e., the Msg3) (step S450).

In this embodiment, it is assumed that the UE contention resolution identity in the Msg4 matches the SI request included in the Msg3, and in response, the UE 110 considers the contention resolution is successful (step S460), and then determines whether the contention-based random access procedure was initiated for SI request (step S470).

In one embodiment, the determination of whether the contention-based random access procedure was initiated for SI request may refer to checking if the recently sent Msg3 includes an SI request, and the UE 110 may consider the contention-based random access procedure was initiated for SI request if the recently sent Msg3 includes an SI request.

Since the contention-based random access procedure was indeed initiated for SI request and the contention resolution is successful, the UE 110 considers the SI request is successfully received by the 5G NR network 120, and indicates the reception of the acknowledgement for the SI request to the upper layers of the MAC layer (step S480).

After the completion of the contention-based random access procedure, the UE 110 monitors the SI window(s) indicated in the minimum SI to receive the requested SI from the 5G NR network 120 (step S490).

In view of the forgoing embodiments, it will be appreciated that the present application realizes SI request through a contention-based random access procedure, in which specific measures are provided for the UE to decide whether the SI request is successfully received by the network side. Advantageously, indeterminate UE behaviors related to SI request delivery may be avoided.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A User Equipment (UE), comprising:
    a wireless transceiver, configured to perform wireless transmission and reception to and from a service network; and
    a controller, configured to perform, during a contention-based random access procedure:
        transmitting a first message comprising a System Information (SI) request to the service network via the wireless transceiver;
        receiving a second message for a contention resolution from the service network via the wireless transceiver in response to transmitting the first message;
        determining whether the contention resolution is successful according to the second message;
        indicating a reception of an acknowledgement for the SI request to an upper layer of a Media Access Control (MAC) layer so that the upper layer considers the SI request being successfully received by the service network, in response to determining that the contention resolution is successful; and
        receiving on-demand SI that was requested by the SI request from the service network subsequent to the upper layer of the MAC layer determining that the SI request is successfully received by the service network,
    wherein after the upper layer of the MAC layer determines that the SI request is successfully received by the service network and before receiving the on-demand SI, the controller is further configured to monitor an SI window indicated in a minimum SI to receive the on-demand SI from the service network, which is a 5G New Radio (NR) network.

2. The UE of claim 1, wherein, during the contention-based random access procedure, the controller is further configured to determine that the contention resolution is successful in response to a UE contention resolution identity in the second message matching the SI request.

3. The UE of claim 2, wherein the second message is a MAC Control Element (CE), and the first message comprises a Common Control Channel (CCCH) Service Data Unit (SDU) comprising the SI request.

4. The UE of claim 1, wherein the controller is further configured to perform the following during the contention-based random access procedure:

determining whether the contention-based random access procedure was initiated for the SI request in response to determining that the contention resolution is successful;

determining that the contention-based random access procedure was initiated for the SI request in response to the first message comprising the SI request; and indicating the reception of the acknowledgement for the SI request to the upper layer of the MAC layer in response to determining that the contention-based random access procedure was initiated for the SI request.

5. The UE of claim 1, wherein the first message does not comprise a UE contention resolution identity.

6. The UE of claim 1, wherein, after the contention-based random access procedure, the controller is further configured to receive the on-demand SI that was requested by the SI request from the service network via the wireless transceiver.

7. A method for System Information (SI) request through a contention-based random access procedure, executed by a UE wirelessly connected to a service network, comprising:

transmitting a first message comprising an SI request to the service network;

receiving a second message for a contention resolution from the service network in response to transmitting the first message;

determining whether the contention resolution is successful according to the second message;

indicating a reception of an acknowledgement for the SI request to an upper layer of a Media Access Control (MAC) layer so that the upper layer considers the SI request being successfully received by the service network, in response to determining that the contention resolution is successful; and receiving on-demand SI that was requested by the SI request from the service network subsequent to the upper layer of the MAC layer determining that the SI request is successfully received by the service network, wherein after the upper layer of the MAC layer determines that the SI request is successfully received by the service network and before receiving the on-demand SI, the controller is further configured to monitor an SI window indicated in a minimum SI to receive the on-demand SI from the service network, which is a 5G New Radio (NR) network.

8. The method of claim 7, further comprising:

determining that the contention resolution is successful in response to a UE contention resolution identity in the second message matching the SI request.

9. The method of claim 8, wherein the second message is a MAC Control Element (CE), and the first message comprises a Common Control Channel (CCCH) Service Data Unit (SDU) comprising the SI request.

10. The method of claim 7, further comprising:

determining whether the contention-based random access procedure was initiated for the SI request in response to determining that the contention resolution is successful;

determining that the contention-based random access procedure was initiated for the SI request in response to the first message comprising the SI request; and indicating the reception of the acknowledgement for the SI request to the upper layer of the MAC layer in response to determining that the contention-based random access procedure was initiated for the SI request.

11. The method of claim 7, wherein the first message does not comprise a UE contention resolution identity.

* * * * *